United States Patent [19]

Gonet

[11] 4,445,196
[45] Apr. 24, 1984

[54] ELECTRONIC BIBLE

[76] Inventor: Helen G. Gonet, 72 Holyoke St., Lynn, Mass. 01901

[21] Appl. No.: 250,416

[22] Filed: Apr. 2, 1981

[51] Int. Cl.³ .............................................. G06F 15/02
[52] U.S. Cl. ..................................... 364/900; 364/419
[58] Field of Search ................ 364/200, 900, 419, 710

[56] References Cited

U.S. PATENT DOCUMENTS

| | | | |
|---|---|---|---|
| 3,760,171 | 9/1973 | Wang et al. | 364/710 |
| 3,848,232 | 11/1974 | Leibler et al. | 364/200 |
| 3,932,859 | 1/1976 | Kyriakides et al. | 364/900 |
| 4,117,542 | 9/1978 | Klausner et al. | 364/900 |
| 4,125,868 | 11/1978 | Heuby et al. | 364/900 |
| 4,158,236 | 6/1979 | Levy | 364/900 |
| 4,218,760 | 8/1980 | Levy | 364/900 |
| 4,249,172 | 2/1981 | Watkins et al. | 364/900 |
| 4,328,562 | 5/1982 | Hashimoto | 364/900 |
| 4,339,806 | 7/1982 | Yoshida | 364/900 |

FOREIGN PATENT DOCUMENTS 1448211  9/1973  United Kingdom ................ 364/900

OTHER PUBLICATIONS

Hunter, David, "How They Got the Bible on Disk," Softalk, 1982.

*Primary Examiner*—Jerry Smith
*Assistant Examiner*—Michael R. Fleming

[57] ABSTRACT

A method of enhancing the learning and appreciation of passages from the Bible entails providing a portable electronic Bible having an electronic character display means, biblical text storage means, and input address means for causing selected passages from the Bible to be rapidly displayed during the course of and after the end of a religious gathering. The system may be preprogrammed by the leader of the religious gathering by entering data indicative of selected passages into a selection command program store, so that the selected passages may be thereafter read out in sequence merely by touching a single button during the gathering. The program store may also be employed by the participants of a religious gathering to similarly preprogram the system prior to the religious gathering and/or to retain the selection command data so that the selected passages may be viewed for further study and prayer after the termination of the religious gathering. As a result, the relatively slow and tedious retrieval of the selected passages, due to the thinness of the pages and small print associated with Bibles generally in use, is circumvented. Large letter readout is particularly helpful to those with poor eyesight and children.

4 Claims, 2 Drawing Figures

ELECTRONIC BIBLE

BACKGROUND OF THE INVENTION

It is an object of the present invention to provide a hand-held electronic bible which is used in accordance with the invention in various ways to increase the ease and interest in reading and studying the bible during the course of religious gatherings such as bible study groups, Sunday school sessions, religious services, and family prayer hours.

Most bibles have a great deal of text printed upon thin pages, which text is, for many people, difficult to read owing to the necessary relatively small print. Large print bibles are available which are too heavy and bulky for general use. During the course of religious gatherings, the participants often have to thumb through the pages to locate various passages for recitation and study. The thinness of the pages and the small print tend to make this retrieval process difficult, particularly for older people with poor eyesight and children.

It is thus an object of the invention to provide a portable electronic bible which enables rapid retrieval of selected biblical passages. The electronic character display employed also permits the generation of relatively large letters which is particularly helpful to those with poor eyesight. It is a further object of the invention to provide a portable electronic Bible which is capable of regenerating, various biblical passages displayed during a religious gathering, at a later time for further study and prayer.

This enables a participant in the religious gathering to rapidly review the passages for further study without having to remember or write down the names of the passages read during the gathering.

SUMMARY OF PREFERRED EMBODIMENTS OF THE INVENTION

In accordance with the present invention, a portable electronic bible is provided having an electrically operated character display screen, a biblical text storage device, and an input address device including a keyboard which enables rapid retrieval of selected text electronically stored within the text storage device for display upon the character display screen. Additionally, a selection command storage circuit is preferably provided for retaining the address data produced by the input device, which controls the selection of text so that various passages retrieved and viewed during a religious gathering may be thereafter again viewed in the same sequence as that sequence employed during the religious gathering and as a result learning is enhanced during subsequent restudy of the service or Sunday school lesson. Also, the selection command storage circuitry may optionally be programmed by a religious leader, and for that matter by the participants, prior to the religious gathering so that one passage after the other may be displayed merely by touching a retrieval button. During the course of the religious gathering, the leader and participants may rapidly retrieve selected passages for viewing without the above mentioned difficulty often entailed in thumbing through compact bibles generally in use.

Other objects, features and advantages of the present invention will become apparent upon study of the detailed description taken in conjunction with the drawings, in which:

FIG. 1 illustrates the face of an embodiment of the electronic Bible; and,

FIG. 2 schematically illustrates exemplary electronic circuitry of an embodiment of the invention.

DETAILED DESCRIPTION

Figure 1:
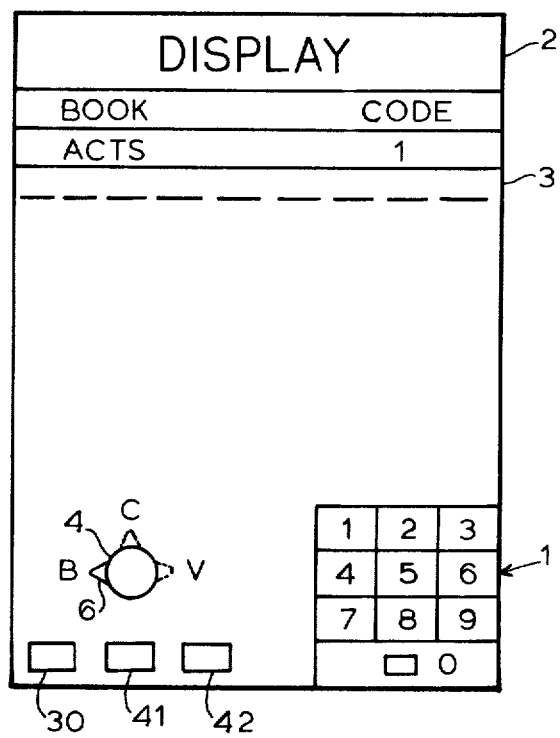

In FIG. 1, a numerical keyboard 1 is disclosed for generating input address data to be used for retrieving selected passages from the text storage circuitry. Display screen 2 comprises a liquid crystal or light emitting diode read out device well-known in the art. A printed table 3 could be formed on the front or the back of the device to enable look up of the numerical code associated with a book, for example, code "one" would identify the "Acts of the Apostles." The books would be listed alphabetically in the lefthand portion of the table and the address code would be printed to the right as illustrated. Knob 4 would be provided to enable the access of selected passages from the Bible as will be explained below. Briefly, the numerical code for the book is entered when pointer 6 points to the left. Knob 4 is thereafter turned so that pointer 6 points toward the chapter indicia c, the number of the chapter is entered, and knob 4 is again turned so that the pointer points to the verse indicia, and the number of the verse is entered.

Figure 2:
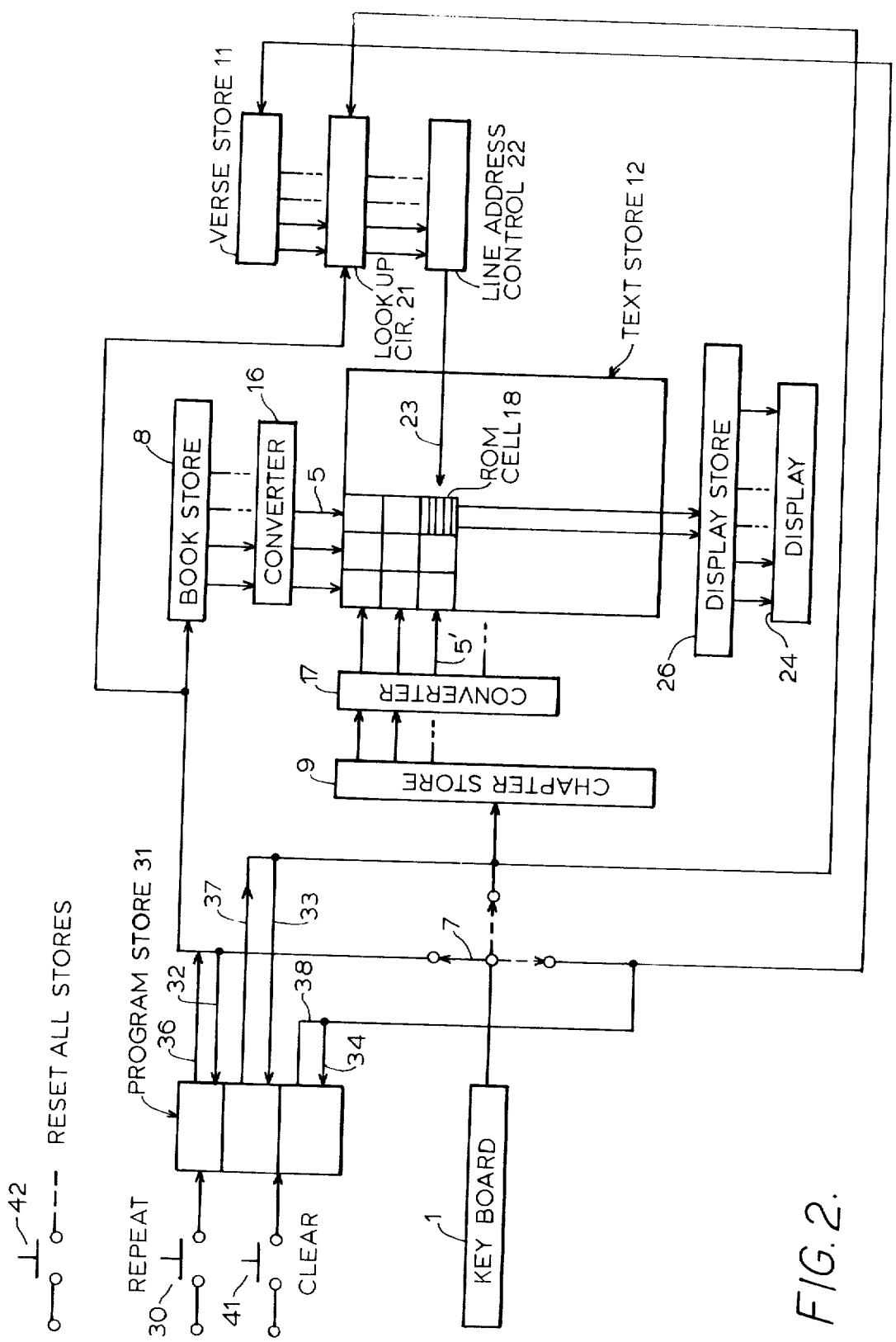

Keyboard 1 is illustrated in the lefthand portion of FIG. 2 and contact pointer 7, which is positioned by knob 4, is shown coupled to the output of keyboard 1 to be fed into book buffer store 8. Pointer 7 is turned so that the keyboard is now coupled to chapter buffer store 9 and the number of the chapter is inserted therein. Knob 4 is again turned and pointer 7 is coupled to verse buffer store 11 and the number of the verse is inserted therein. Of course, a pushbutton controlled steering circuit could be substituted for rotary pointer 7. Text store 12 could comprise an array of ROM cells which store the biblical text to be retrieved. The binary code in book store 8 could, for example, mark lead 5 via the action of binary to decimal converter 16, and the code in chapter store 9 could mark lead 5' via converter 17, thereby to enable the selection of a single ROM cell 18 by means of conventional cross point address circuitry. Since the text of the Bible is quite voluminous, replaceable ROM plug in modules may be employed, each module containing a given portion of the Bible. See U.S. Pat. No. 4,218,760 to Levy, who also discloses ROM address techniques. This action enables the generation of data only from selected ROM cell 18 which contains the text of the selected book and the selected chapter.

Since the starting line of a selected verse will be different for each selected ROM cell, a line dictionary or look up table is provided which will address the proper data line within the selected ROM cell. Look up circuit 21 sequentially receives the book, chapter and verse data fed into buffers 8, 9 and 11. Circuit 21 could of course, comprise any well-known magnetic storage device. The addressing of look up circuit 21 by the book, chapter and verse data generates a line address code which is inserted into line address control circuit 22, which in turn controls pointer 23, so that the pointer selects the particular line of text within selected ROM cell 18 which represents the beginning of the selected verse. The selected binary data within cell 18 is thereafter sequentially inserted into display store 26 which in turn produces, preferably an enlarged, visual image display of the text on display screen 24. State-of-the-art ROM data look up, retrieval, and display techniques, are taught in U.S. Pat. Nos. 4,218,760; 4,117,542; 3,932,859; 4,125,868; 3,848,232 and 3,999,060; incorporated by reference herein. These patents, relating to text retrieval and language translation devices, are the closest known prior art. The nature of address pointer 23 is, of course, well-known to those skilled in the art and is described in U.S. Pat. No. 4,249,172.

After the selected passage is read, the above process is repeated to select another desired passage. As previously discussed, it is desirable to enable the user of the electronic Bible to replay the selected passages after the religious gathering is over and thus a selection command storage circuit or "pipeline" program store 31 is provided to sequentially register all of the selection command data in the order generated by the keyboard during the course of the religious service. During "replay", the repeat button 30 is actuated to cause the sequential generation of the selection command data previously generated by the actuation of the keyboard during the course of the religious gathering in the proper order. The book data is inserted into program store 31 via lead 32, the chapter data is inserted into memory 31 via lead 33, and the verse data is inserted into memory 31 via lead 34. The actuation of replay or repeat button 30 causes the stored data to be sequentially inserted into the book, chapter and verse buffers via leads 36, 37 and 38 respectively. Clear button 41 is actuated to clear or erase program memory 31 when the retention of the previous group of selected passages is no longer desired.

To review briefly, the actuation of the keyboard from time to time during the course of a religious gathering causes the sequential generation of selected passages upon the viewing screen. The selection command data generated by the keyboard and applied to the text store 12 may also be stored in a program memory or selection command data store 31 to enable later regeneration of the text viewed during the religious gathering.

Now, let it be assumed that a religious leader desires to preprogram the electronic Bible before the commencement of a religious gathering. He actuates knob 4 controlling pointer 7, as previously described, to enter the first book, chapter and verse to be selected. Since he may not care to view the passages at this time, he may actuate reset button 42 which immediately clears buffers 8, 9, 11 and 22 to inhibit the text retrieval display operation, and may thereafter immediately enter the next book, chapter, and verse and again operate reset button 43, and so on, until all of the passage address data has been entered in sequence into program store 31. When the leader conducts the religious gathering all he has to do is to touch the repeat button 30 to sequentially call up selected passages, in contrast with operating the keyboard. The participants employing the electronic Bible, on the other hand, would normally operate the keyboard during the course of the gathering unless they receive a program menu prior to the commencement of the religious service. Such a menu could be passed out or otherwise made available to the participants prior to the commencement of the gathering to permit the participants to preprogram the device, as above, so as to reduce participant distraction during the gathering. Another possibility is to provide display components 24 and 26 within the pews of a church and to wire or radio link these units to the remaining circuitry of FIG. 2 positioned at the pulpit. This approach is less preferred since the replay of the selected passages after the service would not be possible although text storage structure would be greatly reduced.

The term "Bible" as used herein is intended to cover any religious work in any language such as the Old and New Testaments in any version, the Koran, etc. The device may be contained within a casing of plastic or fabric which could have the appearance of a traditional Bible.

I claim:

1. A hand-held electronic calculator for enhancing the learning and appreciation of passages from the Bible comprising:
   a. character display means for generating visual characters in response to the application of electrically coded signals thereto;
   b. biblical text storage means for storing electrically coded data manifesting biblical text therein;
   c. biblical passage address keying means for enabling the application of selection command data manifesting selected book, chapter and verse of said passages to said biblical text storage means for in turn enabling generation of data indicative of particular selected passages from the text stored within said storage means; and,
   d. display control circuitry coupled between said text storage means and said character display means for causing said display means to produce selected visual text in response to the application of said selection command data generated by said address keying means to said text storage means.
   e. keying means coupled to said addressing means for entering selected book, chapter and verse data.

2. The calculator set forth in claim 1 further including selection command data storage means coupled to said biblical text storage means for retaining data indicative of said selection command data generated by said address keying means for enabling regeneration of selected text at a later time.

3. The calculator as set forth in claim 1 wherein said character display means is configured to produce larger characters than those printed in the average Bible.

4. The calculator as set forth in claim 2 wherein said character display means is configured to produce larger characters than those printed in the average Bible.

* * * * *